Jan. 13, 1931. O. C. SNYDER 1,788,750
NUT LOCK
Filed June 23, 1928

Inventor
O. C. Snyder
By Lacey & Lacey, Attorneys.

Patented Jan. 13, 1931

1,788,750

UNITED STATES PATENT OFFICE

ORLOW C. SNYDER, OF LONG ISLAND CITY, NEW YORK

NUT LOCK

Application filed June 23, 1928. Serial No. 287,801.

The present invention is directed to improvements in nut locks.

The primary object of the invention is to provide a nut lock which is exceedingly simple in construction and will effectively prevent the loss of the nut from the bolt.

Another object of the invention is to provide a device of this character wherein the nut will be held against accidental disengagement from the bolt by a section of ductile metal.

Another object of the invention is to provide a device of this kind so constructed that the conventional form of bolt and nut can be used, the locking means being fused or soldered to the bolt and being capable of being distorted or flattened to form an abutment to prevent accidental removal of the nut from the bolt.

Another object of the invention is to provide a nut lock so constructed that upon the application of the flame of a blow torch the locking means can be removed to permit removal of the nut, and without injuring the nut or bolt.

With these and other objects in view, this invention resides in the novel features of construction, formation, combination and arrangement of parts to be hereinafter more fully described, claimed and illustrated in the accompanying drawing, in which:—

Figure 1:
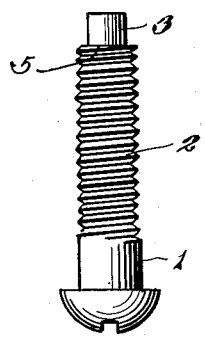
Figure 1 is a side view of a bolt provided with the ductile section.
Figure 2:
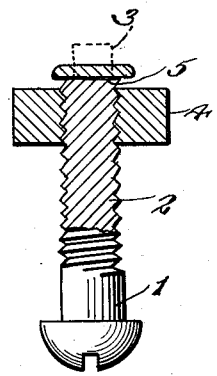
Figure 2 is a view partly in section showing the nut in place and the section distorted.

Referring to the drawing and more particularly to Figures 1 and 2 thereof, 1 designates the bolt having a threaded shank 2 as customary. Fused or otherwise fixed to the end of the bolt shank is a cylindrical section of ductile metal, or metal which can be readily distorted or flattened when subjected to the impact or blows from a hammer or other tool. In Figure 1 it will be noted that the diameter of the section 3 is less than that of the bolt shank in order that the nut 4 can be conveniently threaded upon the bolt. As shown in Figure 2 the nut 4 is engaged with the bolt shank and the section 3 is flattened or distorted to such an extent that an abutment is formed to prevent accidental removal of the nut.

Figure 3:
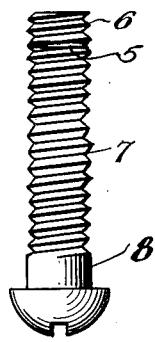
Figure 3 is a side elevation of a modified form of the bolt.
Figure 4:
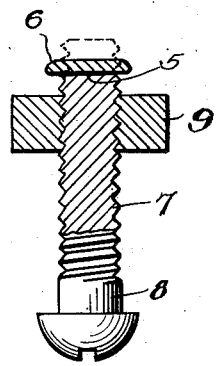
Figure 4 is a view partly in section showing the nut in place and the ductile section distorted.

In Figure 3 the section 6 is of the same diameter as the shank 7 of the bolt 8, it being necessary in this instance that the section be threaded in order that the nut 9 can be placed upon the bolt. After the nut 9 is engaged with the bolt the section 6 is flattened as shown in Figure 4, consequently providing an abutment to prevent accidental removal of the nut.

Should it be desired to remove the nut it is only necessary to subject the section to the flame of a blow torch to melt the same, thus permitting the nut to be conveniently removed.

It will be obvious that the construction is such that conventional forms of bolts can be used upon suitably securing thereon the ductile section. The nut locking element 3 or 6 consists of metal which is readily fusible and adapted to be easily upset or swaged to provide an abutment to secure the nut against accidental displacement. The metal preferred is lead, although any suitable alloy containing lead may be employed. The locking element forms in effect a part of the bolt since it is secured thereto by a fused joint, as indicated at 5.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What is claimed is:—

A nut and bolt lock consisting of a bolt and a readily fusible nut locking element soldered to the end of the bolt and adapted to pass through a nut to be upset to provide a locking abutment which is removable in its entirety in a molten condition to release the nut for subsequent detachment.

In testimony whereof I affix my signature.

ORLOW C. SNYDER. [L. S.]